US009153098B2

(12) United States Patent
Yoseloff et al.

(10) Patent No.: US 9,153,098 B2
(45) Date of Patent: Oct. 6, 2015

(54) METHOD AND APPARATUS FOR VARIABLE CONTRIBUTION PROGRESSIVE JACKPOTS

(71) Applicant: Bally Gaming, Inc., Las Vegas, NV (US)

(72) Inventors: Mark L. Yoseloff, Henderson, NV (US); David Pokorny, Las Vegas, NV (US); Feraidoon Bourbour, Eden Prairie, MN (US); James R. Roberts, North Las Vegas, NV (US)

(73) Assignee: Bally Gaming, Inc., Las Vegas, NV (US)

( * ) Notice: Subject to any disclaimer, the term of this patent is extended or adjusted under 35 U.S.C. 154(b) by 0 days.

(21) Appl. No.: 14/293,786

(22) Filed: Jun. 2, 2014

(65) Prior Publication Data

US 2014/0274351 A1 Sep. 18, 2014

Related U.S. Application Data

(63) Continuation of application No. 11/803,980, filed on May 15, 2007, now Pat. No. 8,740,692.

(51) Int. Cl.
*G06F 17/00* (2006.01)
*G07F 17/32* (2006.01)

(52) U.S. Cl.
CPC .................................. *G07F 17/3258* (2013.01)

(58) Field of Classification Search
USPC ...................................................... 463/16–26
See application file for complete search history.

(56) References Cited

U.S. PATENT DOCUMENTS

| | | | |
|---|---|---|---|
| 4,836,553 | A | 6/1989 | Suttle et al. |
| 4,861,041 | A | 8/1989 | Jones et al. |
| 5,078,405 | A | 1/1992 | Jones et al. |
| 5,098,107 | A | 3/1992 | Boylan et al. |
| 5,288,081 | A | 2/1994 | Breeding |
| 5,308,065 | A | 5/1994 | Bridgeman et al. |
| 5,377,973 | A | 1/1995 | Jones et al. |
| 5,417,430 | A | 5/1995 | Breeding |
| 5,489,101 | A | 2/1996 | Moody |
| 5,531,448 | A | 7/1996 | Moody |
| 5,538,252 | A | 7/1996 | Green |
| 5,584,486 | A | 12/1996 | Franklin |
| 5,653,444 | A | 8/1997 | Dahl |
| 5,673,917 | A | 10/1997 | Vancura |
| 5,685,774 | A | 11/1997 | Webb |
| 5,732,950 | A | 3/1998 | Moody |
| 5,743,800 | A | 4/1998 | Huard et al. |

(Continued)

FOREIGN PATENT DOCUMENTS

WO 2007030641 3/2007

OTHER PUBLICATIONS

DEQ, "Electronic Auxiliary System for Live Casino Table Games," origin as early as 2006, 12 pages.

(Continued)

*Primary Examiner* — Ronald Laneau
(74) *Attorney, Agent, or Firm* — TraskBritt

(57) ABSTRACT

Methods and apparatuses for variable contribution multiple progressive jackpot games are disclosed. A variable contribution rate is determined as a function of a wager level. A contribution amount is determined by multiplying each wager by its corresponding contribution rate. The contribution amount is then added to at least two jackpot meters.

20 Claims, 6 Drawing Sheets

(56) References Cited

U.S. PATENT DOCUMENTS

| | | | | |
|---|---|---|---|---|
| 5,876,283 | A | 3/1999 | Parra et al. | |
| 6,019,374 | A | 2/2000 | Breeding | |
| 6,139,430 | A | 10/2000 | Huard et al. | |
| 6,146,270 | A | 11/2000 | Huard et al. | |
| 6,146,273 | A * | 11/2000 | Olsen | 463/27 |
| 6,334,614 | B1 | 1/2002 | Breeding | |
| 6,336,859 | B2 | 1/2002 | Jones et al. | |
| 6,485,368 | B2 | 11/2002 | Jones et al. | |
| 6,698,759 | B2 | 3/2004 | Webb et al. | |
| 6,726,564 | B2 | 4/2004 | Hogan et al. | |
| 6,929,264 | B2 | 8/2005 | Huard et al. | |
| 7,568,973 | B2 * | 8/2009 | Iddings et al. | 463/25 |
| 7,585,223 | B2 * | 9/2009 | Iddings et al. | 463/27 |
| 7,651,394 | B2 * | 1/2010 | Johnson | 463/26 |
| 2001/0040345 | A1 | 11/2001 | Au-Yeung | |
| 2002/0113371 | A1 | 8/2002 | Snow | |
| 2002/0195775 | A1 | 12/2002 | Webb et al. | |
| 2003/0042679 | A1 | 3/2003 | Snow | |
| 2003/0050106 | A1 | 3/2003 | Lyfoung | |
| 2004/0102234 | A1 | 5/2004 | Gold | |
| 2004/0150163 | A1 | 8/2004 | Kenny et al. | |
| 2004/0217548 | A1 | 11/2004 | Snow | |
| 2004/0224777 | A1 | 11/2004 | Smith et al. | |
| 2005/0032563 | A1 | 2/2005 | Sines | |
| 2005/0032564 | A1 | 2/2005 | Sines | |
| 2005/0051958 | A1 | 3/2005 | Snow | |
| 2005/0164759 | A1 | 7/2005 | Smith et al. | |
| 2005/0164762 | A1 | 7/2005 | Smith et al. | |
| 2005/0239542 | A1 | 10/2005 | Olsen | |
| 2005/0269782 | A1 | 12/2005 | Sklansky et al. | |
| 2006/0084506 | A1 | 4/2006 | Yoseloff et al. | |
| 2006/0119044 | A1 | 6/2006 | Kekempanos et al. | |
| 2006/0178183 | A1 | 8/2006 | Van Asdale | |
| 2006/0186599 | A1 | 8/2006 | Kenny et al. | |
| 2006/0267285 | A1 | 11/2006 | Webb et al. | |
| 2006/0284376 | A1 | 12/2006 | Snow | |
| 2007/0024005 | A1 | 2/2007 | Snow | |
| 2007/0102882 | A1 | 5/2007 | Snow | |
| 2007/0210520 | A1 | 9/2007 | Webb | |
| 2009/0042643 | A1 * | 2/2009 | Gagner et al. | 463/27 |

OTHER PUBLICATIONS

Letter from James R. Yee, Howard & Howard Attorneys PLLC, dated Dec. 6, 2011, with attached brochure excerpt, "Promotional System 3G, User Guide," 2003, DEQ Casinos, 5 total pages.

Australian Examiner's First Report on Patent Application No. AU 2008201891, May 23, 2012, 3 pages.

* cited by examiner

METHOD AND APPARATUS FOR VARIABLE CONTRIBUTION PROGRESSIVE JACKPOTS

CROSS-REFERENCE TO RELATED APPLICATION

This application is a continuation of U.S. patent application Ser. No. 11/803,980, filed May 15, 2007, now U.S. Pat. No. 8,740,692, issued Jun. 3, 2014, the disclosure of which is hereby incorporated herein in its entirety by this reference.

TECHNICAL FIELD

The embodiments described herein relate generally to the field of progressive jackpot gaming, and more specifically to a method and apparatus for funding a progressive jackpot game.

BACKGROUND

A progressive jackpot game is a game that has a jackpot that increases in value for every progressive wager made until a predefined winning event occurs. Progressive jackpots have been incorporated in electronic and mechanical gaming devices (e.g., slot machines) and table games. The predefined winning event or events vary based on the game played, for example, the top hand (e.g., a royal flush) in CARIBBEAN STUD® Poker or FORTUNE PAI GOW POKER®, matching 15 out of 15 numbers in video Keno, or lining up the winning combination (e.g., five special symbols) on the same payline of a slot machine. Winning events may pay a fixed amount (i.e., "fixed pay winning event"), odds payouts (multiples of the amount wagered), or pay a percentage of the progressive jackpot (i.e., "progressive jackpot winning event") up to and including the entire value of the jackpot and combinations thereof. Each game may have multiple winning events. After a progressive jackpot winning event, the progressive jackpot may be funded or "seeded" with a set amount of money (e.g., $10,000) to encourage play. Progressive jackpot gaming of the type discussed above is generally known as discussed, for example, in U.S. Pat. No. 4,861,041, which is hereby incorporated by reference in its entirety.

Although the odds of winning a progressive jackpot payout are typically very low, progressive wagers attract player interest because the payout amounts are usually relatively high. Player interest typically increases as the jackpot increases. However, when the jackpot value is low, for example, after a jackpot hits, player interest typically decreases. In traditional progressive jackpot games, the progressive contribution rate, that is, the amount of money added to the jackpot by the house for each wager event, is the same for all wagers. To encourage play when the jackpot value is low, game operators (e.g., a casino or a multi-casino entity) may set the progressive contribution rate to a higher value. However, the higher contribution rate is not needed when the jackpot value is high.

DETAILED DESCRIPTION OF THE INVENTION

Figure 1:
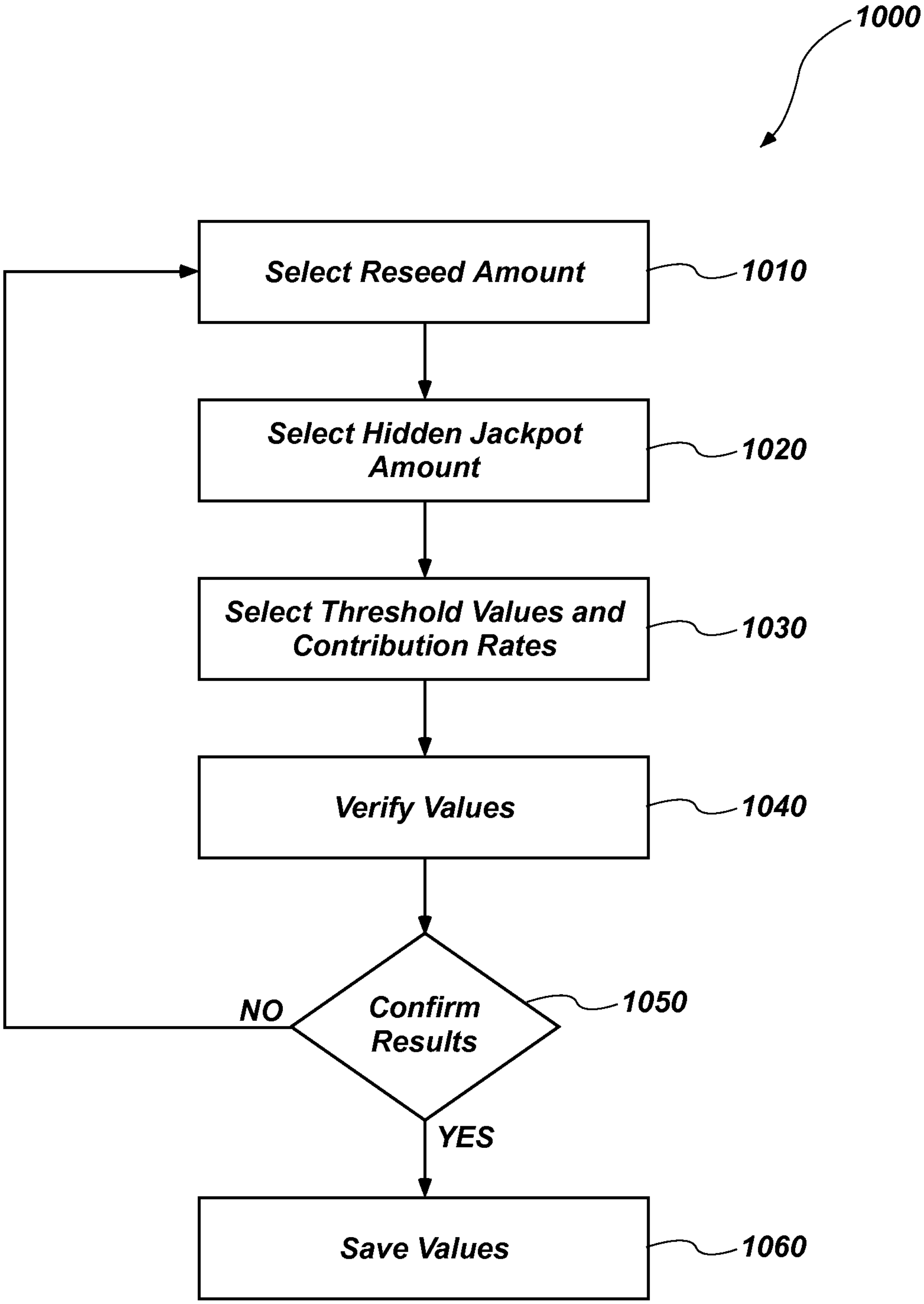
FIG. 1 illustrates a flowchart of a variable contribution rate configuration method in accordance with an embodiment.

In the following detailed description, reference is made to the accompanying drawings which form a part hereof, and in which is shown by way of illustration specific embodiments that may be practiced. These embodiments are described in sufficient detail to enable those of ordinary skill in the art to make and use them, and it is to be understood that structural, logical, or procedural changes may be made to the specific embodiments disclosed.

When a player makes a progressive wager, for example, $1.00, a certain portion of that wager is, on average, over time, returned to players and the remainder of the money is held by the operator of the game. "Return" may be defined as the average amount of money returned to the players over time for each wager placed. For example, some gaming jurisdictions mandate a minimum return to customers, for example, a 75% return. The operator can only "hold" 25% of all wagers made and the players must ultimately receive a return of 75% or greater, over time. Therefore, the return plus the hold represents 100% of the total wager. In other words, $$\text{hold}=1-\text{return}, \tag{1}$$

where hold and return are defined above and expressed in decimal form. It should be appreciated that all percentages expressed hereinafter will be in decimal form unless explicitly expressed with a percent sign (i.e., %).

The return may be a function of multiple components based on the game being played and the predefined winning events for that game, such as, for example, a contribution rate to the progressive jackpot, a fixed pay rate, an envy pay rate, and a reseed rate. Accordingly, $$\text{return}=\text{contribution rate}+\text{fixed pay rate}+\text{envy pay rate}+\text{reseed rate}, \tag{2}$$

where contribution rate, fixed pay rate, envy pay rate, and reseed rate are described in detail below.

The contribution rate (i.e., progressive contribution) is a percentage of each wager that is accumulated and placed in a jackpot account. The jackpot may be displayed on a meter. Once the amount is credited to the meter, it is no longer house money. It must by law be distributed to a player. Over time, the jackpot grows until a winning event occurs. A progressive winning event may pay a fixed amount from the meter, a percentage of the jackpot or the entire jackpot. In other embodiments, a winning event may pay an odds payout or any combination of the above payout types.

The fixed pay rate is a percentage of each wager that is allocated for a fixed pay winning event that pays the player a fixed dollar amount, rather than a percentage of the jackpot, for example, in the FORTUNE PAI GOW POKER® game, a royal flush may pay a flat rate of $1000, a straight flush may pay $200, etc. The fixed payouts in a preferred embodiment are paid by the house and are not deducted from the meter. In other embodiments, fixed pays are deducted from the meter. The fixed pay rate may be determined by summing the products of the probability of each fixed pay winning event and the payout amount for the corresponding winning event. For example, in the game FORTUNE PAI GOW POKER®, a royal flush may have a probability of 0.00018349 and a straight flush may have a probability of 0.00135464. If these were the only two fixed payouts in the game, the fixed payout rate would be calculated as 0.454418 (i.e., \$1000×0.00018349+\$200×0.00135464).

The envy pay rate is a percentage of each wager that is allocated for a fixed pay winning event that pays the player a fixed dollar amount when another player has a predetermined winning hand, for example, a player may win an envy payout of \$50 if another player has a winning event, such as royal flush in the game FORTUNE PAI GOW POKER®, etc. The envy pay rate may be determined by summing the products of the probability of each envy pay winning event and the envy payout amount for each corresponding winning event.

The reseed rate (i.e., reseed contribution) is a percentage of each wager that is allocated for reseeding the jackpot after, for example, a winning event occurs that pays 100% of the jackpot. The reseed rate may be determined by a predetermined or preselected reseed amount multiplied by the probability of a winning event paying the entire progressive jackpot. For example, if an operator selects a reseed amount of \$50,000 for a game with the ultimate progressive winning event having a probability of 0.00000123, then the reseed rate is calculated as 0.0615 (i.e., \$50,000×0.00000123).

If the minimum return to the player is fixed (e.g., by jurisdictional mandate or otherwise), the minimum contribution rate (i.e., the minimum average contribution rate) is derived as a function of the fixed pay rate, envy pay rate, and reseed rate. Accordingly, $$\text{minimum contribution rate} = \text{minimum return} - \text{fixed pay rate} - \text{envy pay rate} - \text{reseed rate}, \quad (3)$$

wherein the minimum contribution rate is the minimum average contribution rate, the minimum return is fixed, the fixed pay rate and envy pay rate are derived statistically as a function of the game being played, and the reseed rate is derived as a function of the game being played and a selected reseed value. For example, if the minimum return to the player is mandated to be 75%, fixed pays are statistically calculated to be 40%, envy pays are statistically calculated to be 3%, and reseed is statistically calculated to be 2%, the progressive contribution rate must average 30% or greater over time.

In traditional progressive jackpot games, the progressive contribution rate is a fixed percentage of the wager, for example, 35%. However, it may be desirable for the progressive jackpot to fund at a faster rate immediately upon being seeded to encourage play. Further, it may be desirable for the operator to lower the contribution rate as the jackpot increases in value so the operator can maximize profits without dropping below the legal minimum return over a period of time. Accordingly, there is a need for a variable contribution rate for a progressive jackpot allowing a game operator to control the rate at which the jackpot is funded over time.

In a first embodiment, the contribution rate changes over time at a number of predetermined threshold numbers of wagers made. The threshold number of wagers is selected based on a statistical game cycle. An actual game cycle is defined as the number of times a game is played from the time the progressive jackpot is reseeded until such a time that a player wins the total meter value. The actual game cycle can be contrasted with a statistical game cycle, which is defined as the statistical number of times a game is played from the time the progressive jackpot is reseeded until such a time that a player wins the total meter value (for example, 500,000 to 50,000,000 games played). The contribution rate is based on the jackpot level (e.g., the number of wagers placed during the actual game cycle ("wager count") or amount of the jackpot value), allowing the operator to vary or control the rate at which the jackpot grows. The jackpot growth depends upon the amount of play. When the jackpot level is low, there is less interest in play. It is therefore desirable to contribute more to the jackpot when play is lower to encourage more play. According to the invention, as the jackpot amount increases (or decreases), the contribution rate will automatically be adjusted to the appropriate rate according to an embodiment. For example, as shown in Table 1, the contribution rate changes based on predetermined threshold jackpot amounts.

TABLE 1

Contribution Rate based on jackpot value thresholds, assuming a \$10,000 seed.

| Jackpot Amount | Contribution Rate |
|---|---|
| <\$60,000 | 35% |
| <\$110,000 | 33% |
| <\$160,000 | 27% |
| <\$210,000 | 25% |
| >=\$210,000 | 30% |

It should be appreciated that while five thresholds have been shown in Table 1, any number of thresholds can be used. Additionally, while the thresholds have been expressed as absolute jackpot values, it should be appreciated that any wager level may be used for the thresholds, such as, for example, wager count. Other thresholds may be used, such as time, multiples of seed amount, percentage of theoretical maximum jackpot amount, etc. The contribution rates shown in Table 1 have been selected such that over time, the contribution rate will average to about 30%, but will allow for a faster increase rate when the jackpot is lower in value. By decreasing the contribution rate from a higher to lower value as the wager level increases, the operator may reclaim the overage (i.e., the amount of the contribution rate that is over the minimum contribution rate) as the jackpot increases in value. In other embodiments, individual contribution rates can drop below a level that results in the return dropping beneath the legal minimum.

In one embodiment of the present invention, the funds used to reseed the meter are paid by the casino. Casino operators often dread the occurrence of a top progressive payout because of the obligation to reseed the jackpot.

In order to soften the blow of funding the seed money, a hidden meter is provided that simply increments a predetermined amount with each wager made. When the progressive payout hits and the jackpot (including the seed money) is paid out, the seed amount is transferred from the hidden meter to the progressive meter. The amounts used to fund the seed money still come from a house account, but the operator can be assured that the game is paying for itself.

Baseline configurations for minimum, maximum, and default contribution rates may be provided to the operator. When the operator selects the initial reseed amount, a mathematical model may be used to calculate the reseed rate. For example, if an operator selects a reseed amount of \$50,000 for a game with the ultimate progressive winning event having a probability of 0.00000123, then the reseed rate is calculated as 0.0615 (i.e., \$50,000×0.00000123). Additionally, when the operator attempts to initially select or modify existing values, the new values may be verified to ensure the required minimum overall return is met or exceeded. If the values violate the required minimum return to the player, the new values may be rejected. Any known method of verifying the values may be employed.

FIG. 1 shows a machine prompted process 1000 for entering contribution rate data used in the play of a progressive jackpot game. As shown in the flowchart of FIG. 1, the operator selects a reseed amount (step 1010). The operator may, but need not, be prompted with a default reseed amount prior to selecting the reseed amount. A math model may be used to calculate the reseed rate based on the selected reseed amount. Next, in optional step 1020, the operator may select a hidden jackpot amount. The operator may, but need not, be prompted with a default hidden jackpot amount prior to optionally selecting a hidden jackpot amount. Finally, the operator selects threshold values and corresponding contribution rates (step 1030), for example, as shown in Table 1. The operator may, but need not, be prompted with default threshold values and corresponding contribution rates. Additionally, suggested minimum and maximum contribution rates may, optionally, be displayed to the operator. The values are verified to ensure compliance with the minimum return to players (step 1040). It should be appreciated that any known method of verification can be used to ensure compliance with the minimum return, such as, for example, ensuring a weighted average of the contribution rates and other parameters result in a return to players that meets or exceeds the legal minimum. The results of the verification are displayed and confirmed in step 1050. If the values result in a violation of the minimum return, the operator is warned that the selected values violate the minimum and is given an option to select new values by repeating steps 1010-1030. If there are no violations of the minimum return if the operator overrides the warning, the operator confirms the results and proceeds to step 1060. The values are then saved (step 1060) for later use during game play.

Figure 2:
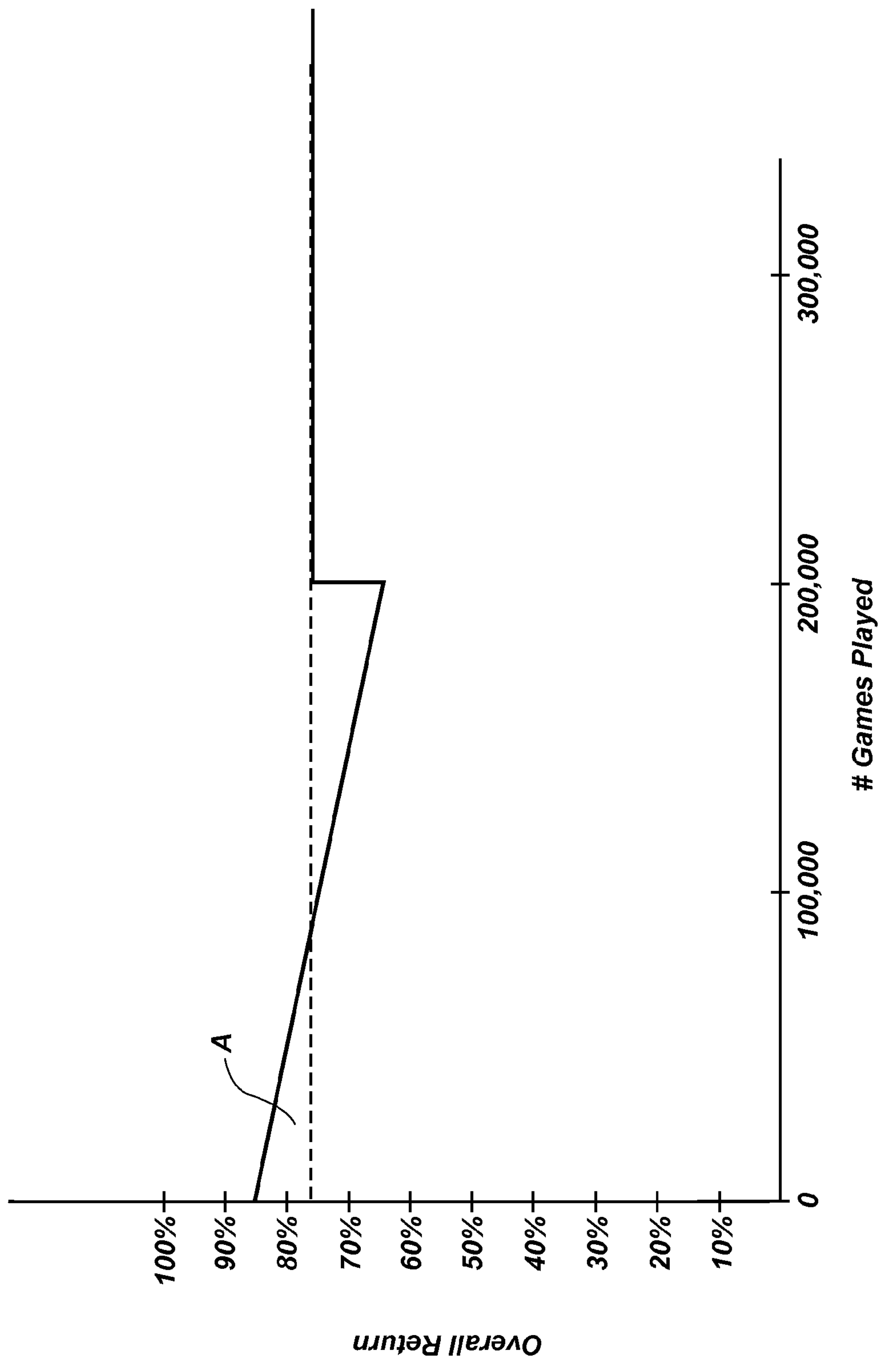
FIG. 2 illustrates a graph showing a contribution rate over an actual game cycle in accordance with an embodiment.

In another embodiment, the progressive contribution rate adjusts automatically according to an algorithm rather than utilizing operator set or default thresholds. By selecting a reseed value and contribution rate algorithm and utilizing a known statistical game cycle, contribution rates can be automatically changed over the statistical game cycle based on some measure of play, such as the wager level. One method of automatically decreasing the contribution rate results in an overall return vs. play as illustrated in FIG. 2. The graph in FIG. 2 shows a return (represented by the solid line) vs. wager count. The dashed line represents a minimum return of 75%. The solid line is derived by selecting a predetermined starting return, such as 85% (resulting in a 10% overage). If the statistical game cycle average is 200,000 wagers to a win, the return at 200,000 plays may be 65% (10% under the minimum contribution). By calculating the slope of the line between the initial return at the first game played and the return at the end of the statistical game cycle, the average return can be calculated based on the wager count within the statistical game cycle. If the jackpot grows beyond the statistical game cycle, e.g., 200,000 games played, then, as shown, the contribution rate is changed to result in a minimum return (e.g., 75%) until the jackpot is won. In this embodiment, the return falls below the minimum over a number of games played in order to recoup the excess contribution, represented by area A in the graph. In other embodiments, the actual contribution rate never falls below the stated minimum.

For ease of implementation, it may be desirable to divide the average statistical game cycle into a number of segments “N” for a statistical game cycle such that the average return results in a legal minimum return to the player. As shown in the graph in FIG. 3, eleven (N=11) segments (represented by the solid line) are shown in a statistical game cycle, e.g., 200,000 games played. After the Nth segment, the contribution rate may be set to the minimum needed to achieve a minimum return, e.g., 75%. It should be appreciated that any number of increments N may be selected. While FIGS. 2 and 3 show the return rate at the minimum after the statistical game cycle ends, it should be appreciated that the setting of the return rate is not so limited.

Figure 4:
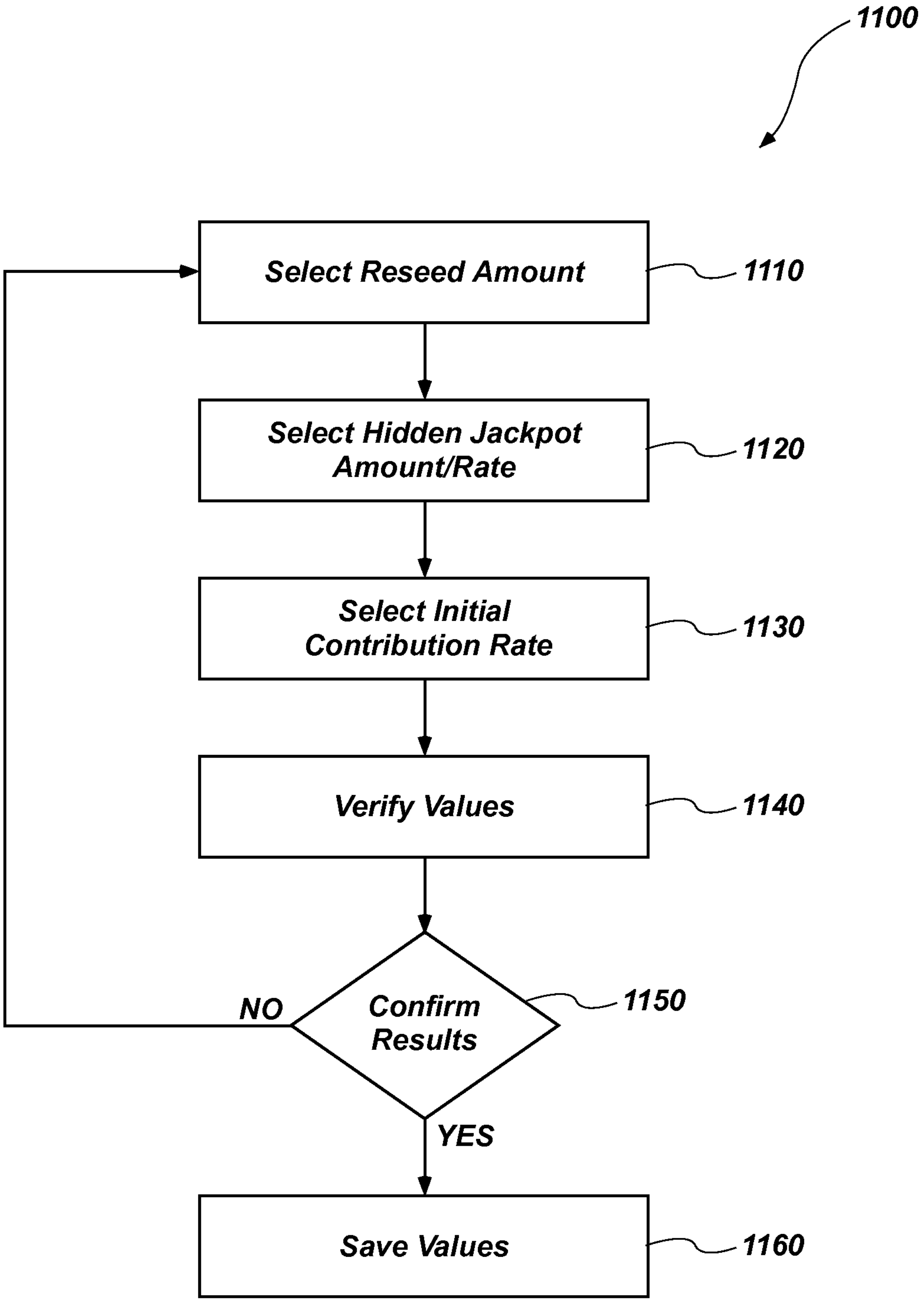
FIG. 4 illustrates a flowchart of a variable contribution rate configuration method in accordance with an embodiment.

FIG. 4 shows a machine prompted process 1100 for entering data for contribution rates automatically adjusted during play of a progressive jackpot game. As shown in the flowchart of FIG. 4, the operator selects a reseed amount (step 1110). The operator may, but need not, be prompted with a default reseed amount prior to selecting the reseed amount. A math model may be used to calculate the reseed rate based on the selected reseed amount. Next, in optional step 1120, the operator may select a hidden jackpot amount. The operator may, but need not, be prompted with a default hidden jackpot amount prior to optionally selecting a hidden jackpot amount. Finally, the operator selects an initial contribution rate (step 1130), for example, 35%. The operator may, but need not, be prompted with a default initial return. The values are verified to ensure compliance with the minimum contribution rate (step 1140). It should be appreciated that any known method of verification can be used to ensure compliance with the minimum return, such as, for example, comparing the initial contribution rate with set minimum and maximum contribution rates. The results of the verification are displayed and confirmed in step 1150. If the values result in a violation of the minimum return, the operator is warned that the selected values violate the minimum return and is given the option to select new values by repeating steps 1110-1130. If there are no violations of the minimum return or if the operator overrides the warning, the operator confirms the results and proceeds to step 1160. The values are then saved (step 1160) for later use during game play.

Figure 3:
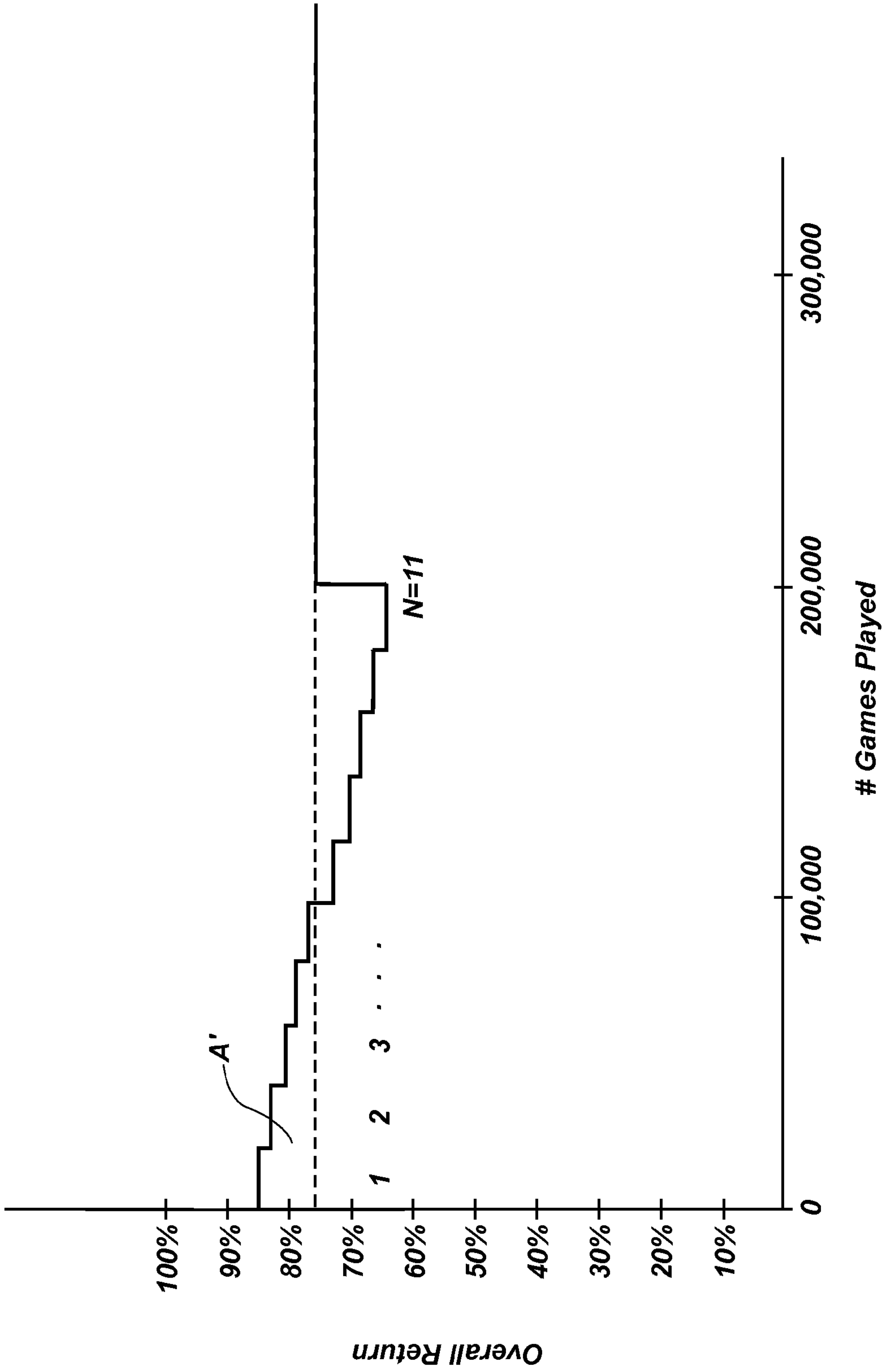
FIG. 3 illustrates a graph showing a contribution rate utilizing increments over an actual game cycle in accordance with an embodiment.

One method of tracking the overage in either the processes illustrated in FIGS. 2 and 3 is to maintain an overage accumulator. The overage accumulator preferably displays an amount represented by areas A and A' in FIGS. 2 and 3. For each bet, the overage accumulator is incremented or decremented by the amount over or under the required minimum contribution, respectively. Utilizing an overage accumulator allows for overage tracking across actual game cycles, allowing for an operator to adjust the contribution rate to achieve the required minimum return to players over time. In other words, if an actual game cycle is shorter than a statistical game cycle, then the operator is likely to have over contributed to the progressive jackpot. Tracking the overage across actual game cycles allows the operator to reclaim that overage in subsequent actual game cycles. Additionally, it may be desirable to provide a wager counter to count the number of wagers that have been placed within a actual game cycle. The wager counter and overage accumulator can be used for, among other things, accounting reconciliation of the game. If permitted by gaming regulations, the overage paid out to one lucky jackpot winner can be recouped by the casino in subsequent game cycles.

Figure 5:
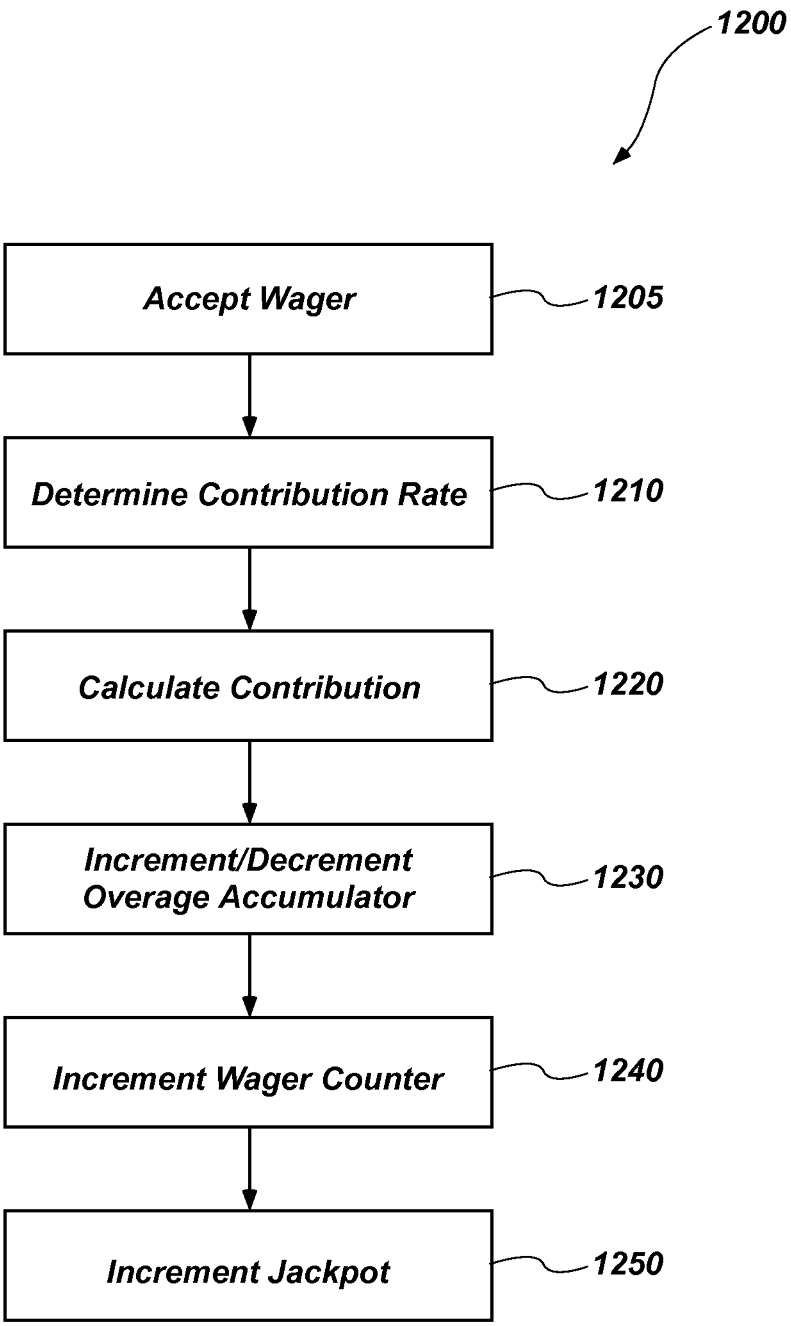
FIG. 5 illustrates a flowchart of a method of funding a progressive jackpot in accordance with an embodiment.

FIG. 5 shows a game operation process 1200 for funding a progressive jackpot based on the contribution rate(s) set in the processes of FIGS. 1 and 4. As shown in the flowchart of FIG. 5, when a player places a wager in a progressive jackpot game, the wager is accepted (step 1205). Next, the contribution rate is determined (step 1210) as a function of the wager level (e.g., jackpot value or wager count) and the contribution rate(s) set in the processes of FIGS. 1 and 4. With an initial determined contribution rate, the contribution is calculated (step 1220), for example, by multiplying the wager amount by the contribution rate. The overage accumulator is then incremented or decremented (optional step 1230). Next, the wager counter is incremented (optional step 1240). Finally, the jackpot is incremented (optional step 1250). While steps 1230, 1240, and 1250 are shown in FIG. 5, they are optional and are not required steps in the embodiment. It should be appreciated that in some instances, steps which follow other steps in the flowcharts of FIGS. 1, 4, and 5 may be in reverse or in a different sequence except where a following procedural step requires the presence of a prior procedural step.

Figure 6:
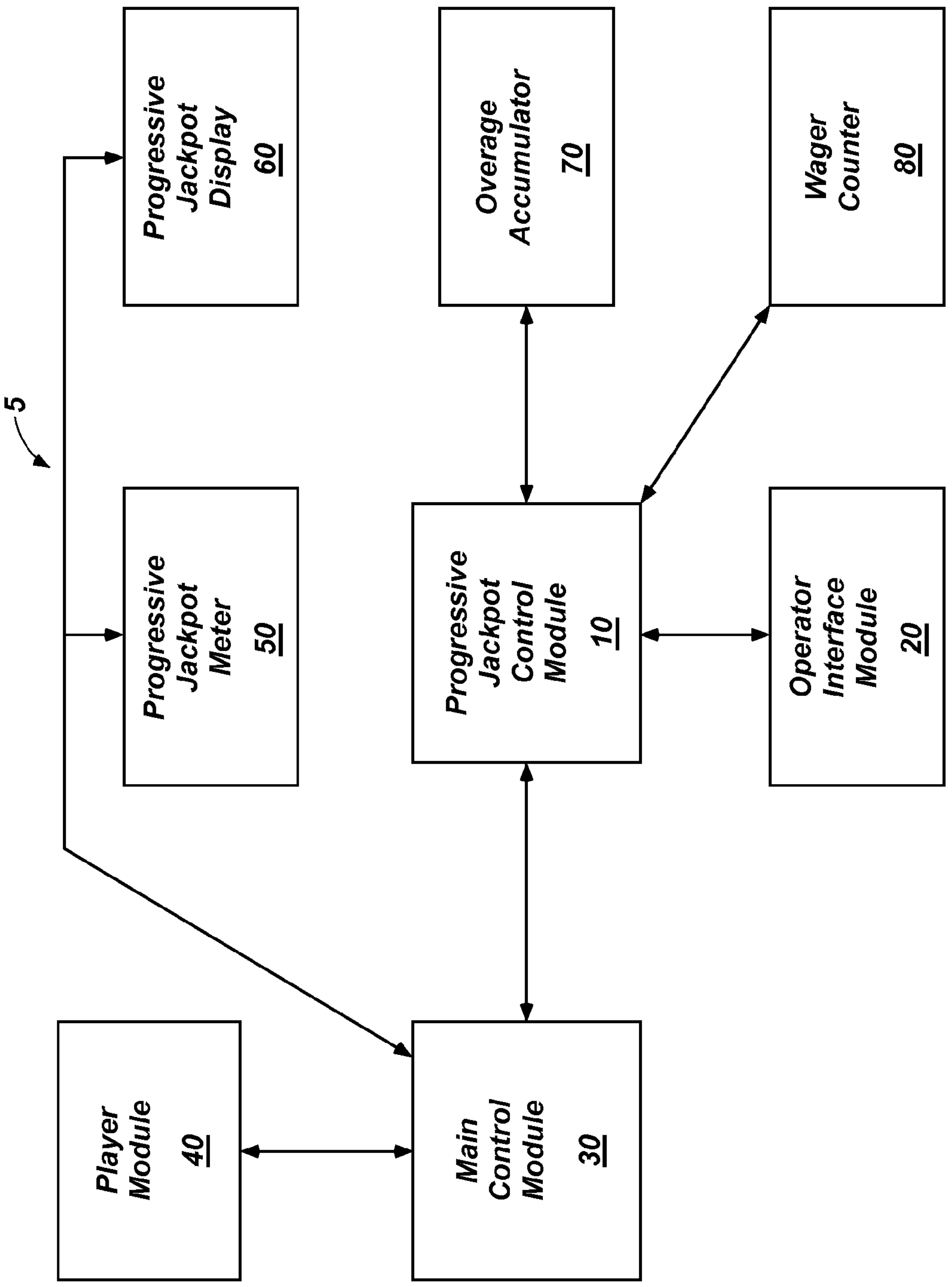
FIG. 6 illustrates a block diagram of a system constructed in accordance with an embodiment.

FIG. 6 illustrates a block diagram of an exemplary progressive gaming system 5, constructed in accordance with an embodiment. A progressive jackpot control module 10 typically administers the jackpot component of a plurality of tables. The progressive jackpot control module 10 communicates with an operator interface module 20. The operator interface module 20 is configured to implement the processes of FIG. 1, FIG. 4, or both FIGS. 1 and 4. The progressive jackpot control module 10, which may be a computer or microprocessor, communicates with a main control module 30 of a gaming table. One or more player modules 40 communicate with the main control module 30. The player modules 40 are responsible for, among other things, recognizing when a progressive wager has been placed. The player module 40 communicates with the main control module 30 when a wager is placed. The main control module 30 alerts the progressive jackpot control module 10 that a wager has occurred. The player module 40 accepts the wager and notifies the control module 30 that a wager was made. The control module 30 increments a progressive jackpot meter 50 and a progressive jackpot display 60. The jackpot control module 10 increments or decrements an overage accumulator 70, and increments a wager counter 80. The progressive jackpot control module 10 is configured to implement the processes of FIG. 5.

A finite number of player modules 40 may be connected directly or indirectly through a game controller to a single progressive jackpot control module 10 through the main control module 30. Multiple modules 30 may be connected to a single progressive control 20. Additionally, the player modules 40 may be hand-held wireless devices or hardwired networked devices. The player modules 40 need not be in the same physical location as the main control module 30. It should be appreciated that while only one progressive jackpot control module 10 is shown in FIG. 6, the invention is not so limited.

The progressive control module 10 may, but need not be configured to warn the operator if the requested values entered in the operator interface module 20 violate a minimum return and may even prevent the operator from proceeding should the minimum return be violated. The operator interface module 20 may also provide an option for the operator to select between a predetermined threshold progressive contribution mode (contribution rates that change at threshold play levels) and an automatic progressive contribution mode (contribution rates that change according to an algorithm).

Player module 40, main control module 30, progressive jackpot control module 10, and operator interface module 20 can be implemented as individual computing devices each having a processor and a memory, where player module 40, main control module 30, and progressive jackpot control module 10, and operator interface module 20 are computer applications stored in the memory and run on the processor. It should be appreciated that these modules can be implemented individually as discussed or combined in any manner on one or more computing devices. Additionally, player module 40, main control module 30, progressive jackpot control module 10, and operator interface module 20 can be implemented in hardware.

Some of the advantages of the progressive jackpot contribution methods and apparatuses disclosed herein include providing configurable contribution rates to encourage play early in an actual game cycle. Additionally, the disclosed methods and apparatuses allow the operator to lower the rate later in the actual game cycle to reclaim (or reduce reclaim) overages. Additionally, the disclosed progressive jackpot contribution methods are simple to implement in hardware or software at a low cost, for example, hardware logic, a programmed processor, or a combination of the two. For example, the methods described above can be implemented in computer instructions and stored in a computer readable medium to perform a method of adjusting a contribution rate as a function of wager count.

While the embodiments have been described in detail in connection with desired embodiments known at the time, it should be readily understood that the claimed invention is not limited to the disclosed embodiments. Rather, the embodiments can be modified to incorporate any number of variations, alterations, substitutions, or equivalent arrangements not heretofore described. For example, while the progressive jackpot has been described as containing only the progressive contribution and the reseed amount, it should be appreciated that the fixed pay amount, envy pay amount, or any other player payout may be displayed on the progressive meter and the meter decremented at the time of a payout. Other embodiments of the invention exclude a reseed amount. Additionally, while the embodiments have been described to meet or exceed a minimum return, it should be appreciated that substantially meeting the minimum return is within the scope of the embodiments.

What is claimed is:

1. A method of operating a gaming device to fund at least two jackpots for a wagering game, the method comprising:

using a processor of the gaming device to:

accept a selected minimum rate of return to players over time;

accept at least one selected reseed value for a first future jackpot of the wagering game, wherein the at least one selected reseed value is accumulated on at least one reseed meter, and the accumulated reseed value is transferred to a first jackpot meter after a first jackpot is awarded;

identify an initial contribution rate and one or more additional contribution rates of player wagers to be selectively apportioned between the first jackpot meter, a second jackpot meter and the at least one reseed meter;

apply a portion of at least the initial contribution rate to a first series of wagers to the first jackpot meter to fund the first jackpot, another portion of at least the initial contribution rate to the second jackpot meter to fund the second jackpot and another portion of at least the initial contribution rate to the at least one reseed meter;

cease applying a portion of at least the initial contribution rate to the at least one reseed meter when the accepted at least one selected reseed value is reached; and applying at least one additional contribution rate to a second series of wagers in response to an occurrence of a threshold event.

2. The method of claim 1, wherein the initial contribution rate is higher than at least some of the one or more additional contribution rates.

3. The method of claim 1, wherein the initial contribution rate and the one or more additional contribution rates are applied by the processor to provide, over time, the selected minimum rate of return to players of the wagering game.

4. The method of claim 3, wherein the initial contribution rate and the one or more additional contribution rates are applied by the processor to provide a rate of return, over time, that does not exceed the selected minimum rate of return.

5. The method of claim 1, wherein the initial contribution rate and the one or more additional contribution rates are identified by an algorithm.

6. The method of claim 1, wherein the minimum rate of return is 75%.

7. The method of claim 1, wherein the reseed value is a fixed amount of zero or greater.

8. The method of claim 1, wherein the initial contribution rate and the one or more additional contribution rates comprise between 2 and 12 contribution rates, and the applied contribution rate is altered, in addition to the at least one selected reseed value being reached, responsive to an occurrence of another threshold event in play of the wagering game.

9. The method of claim 8, wherein the another threshold event is determined as an event selected from the group consisting of: a number of wagers placed, a jackpot amount, elapsed time, a multiple of the at least one selected reseed value, and percentage of a theoretical maximum jackpot.

10. The method of claim 1, wherein amounts contributed in excess of an amount that guarantees a minimum rate of return to the player are accumulated.

11. A method of operating a gaming device to fund at least two jackpots for a wagering game, the method comprising:

using a processor of the gaming device to:

accept a selected minimum rate of return to players over time;

accept at least one selected reseed amount for a future jackpot of the wagering game to be accumulated on at least one reseed meter, and transferred to a first jackpot meter responsive to game play after a current first jackpot is awarded;

identify a first, a second and at least a third contribution rate of player wagers to be selectively apportioned between a first jackpot meter, a second jackpot meter and the at least one reseed meter;

apply the first contribution rate to a first series of wagers to the first jackpot meter to fund the future first jackpot;

apply the second contribution rate to the first series of wagers to the second jackpot meter to fund the future second jackpot;

apply the third contribution rate to the first series of wagers to the at least one reseed meter to fund the at least one selected reseed amount; and apply the at least a third contribution rate to at least the first jackpot meter solely to fund the current jackpot after the occurrence of a threshold event.

12. The method of claim 11, wherein the first contribution rate is higher than the second and the at least a third additional contribution rates.

13. The method of claim 11, wherein the first, the second and the at least a third contribution rates are applied by the processor to provide, over time, the selected minimum rate of return to players of the wagering game.

14. The method of claim 13, wherein the first, the second and the at least a third contribution rates are applied by the processor to provide a rate of return, over time, that does not exceed the selected minimum rate of return.

15. The method of claim 11, wherein the first, the second and the at least a third contribution rates are identified by an algorithm.

16. The method of claim 11, wherein the minimum rate of return is 75%.

17. The method of claim 11, wherein the at least one selected reseed amount is a fixed amount of zero or greater.

18. The method of claim 11, wherein the first, the second and the at least a third contribution rates comprise between 2 and 12 contribution rates, and the applied contribution rate is altered, in addition to the at least one selected reseed amount being reached and the selected minimum rate of return being reached, responsive to an occurrence of another threshold event in play of the wagering game.

19. The method of claim 18, wherein the another threshold event is determined as an event selected from the group consisting of: a number of wagers placed, a jackpot amount, elapsed time, a multiple of the at least one selected reseed amount, and percentage of a theoretical maximum jackpot.

20. The method of claim 1, wherein amounts contributed in excess of an amount that guarantees a minimum rate of return to the player are accumulated.

* * * * *